United States Patent [19]

Leavy et al.

[11] Patent Number: 5,608,651

[45] Date of Patent: Mar. 4, 1997

[54] METHOD AND APPARATUS FOR SCHEDULING AND MIXING MEDIA IN A MULTI-MEDIA ENVIRONMENT

[75] Inventors: Mark Leavy; Murali Veeramoney, both of Beaverton; Michael D. Rosenzweig, Hillsboro; Scott D. Boss, Beaverton; Roger Hurwitz, Hillsboro, all of Oreg.; Bob Davies, Milpitas, Calif.; Daniel R. Cox, Portland, Oreg.

[73] Assignee: Intel Corporation, Santa Clara, Calif.

[21] Appl. No.: 381,212

[22] Filed: Jan. 31, 1995

[51] Int. Cl.$^6$ ................................................... G06F 3/16
[52] U.S. Cl. ................................. 364/514 R; 348/17
[58] Field of Search .......................... 364/514 C, 514 R; 370/84, 60, 58.1; 348/17; 395/200

[56] References Cited

U.S. PATENT DOCUMENTS

| | | | |
|---|---|---|---|
| 4,658,152 | 4/1987 | Walters | 370/84 |
| 4,939,723 | 7/1990 | Harley, Jr. et al. | 370/84 |
| 5,109,378 | 4/1992 | Proctor et al. | 370/58.1 |
| 5,459,724 | 10/1995 | Jeffrey et al. | 370/60 |

*Primary Examiner*—Emanuel T. Voeltz
*Assistant Examiner*—T. Peeso
*Attorney, Agent, or Firm*—Blakely, Sokoloff, Taylor & Zafman

[57] ABSTRACT

A real-time media driver for scheduling and mixing media in a multimedia environment. Implemented to operate in conjunction with a non-real-time operating system, the real-time media driver comprises a wave driver which controls a predominant percentage of the operations of the media hardware device and a mini-device driver which is software provided by the vendor of the media hardware device to support functions unique to the particular media hardware device. Furthermore, the real-time media driver comprises a media scheduler which (i) synchronizes multiple media streams prior to being input into a mixing/splitting device of the media scheduler; (ii) allows reconfiguration of attributes of media streams without loss of content prior to and after operations by the mixing/splitting device; and (iii) appropriately mixes media to produce multi-channel media according to a certain "prioritized sharing" policies.

31 Claims, 7 Drawing Sheets

METHOD AND APPARATUS FOR SCHEDULING AND MIXING MEDIA IN A MULTI-MEDIA ENVIRONMENT

BACKGROUND OF THE INVENTION

1. Field of the Invention

The present invention relates to the field of digital communications. More particularly, the present invention relates to a method and apparatus for scheduling and mixing media such as audio in a multi-media environment.

2. Background Art Related to the Invention

Due to the growing demand for various multi-media applications such as video conferencing over the last few years, businesses now are realizing that successful personal computers ("PCs") must be able to support multi-media applications. Typically, to avoid interactive problems (e.g., "lip-sync") between different types of media defined as digital information producing audio, video or text, multi-media applications require observance of strict timing constraints in processing media. These timing constraints may be satisfied by configuring the PC to process media on a "real-time" basis.

Currently, a multi-tasking operating system called "Windows", developed by Microsoft Corporation of Redmond, Wash., is one of the most widely-used operating systems for PCs. As shown in FIG. 1, an audio subsystem 100 of Windows™ includes a well-known Wave Application Programming Interface ("Wave APE") 105 which provides a standard interface for an arbitrary number "n" of Windows-based application programs 115a–115n to communicate with an audio driver 120 residing in a protected "Ring 3" environment of Windows™. The audio driver 120 transfers blocks of audio from the Windows-based application programs 115a–115a to an audio hardware device 125.

However, most PCs operating in a Windows™ environment are unable to fully support multi-media applications. This is due largely to the fact that Windows™ is a non-real-time operating system and therefore, is subject to a wide variety of interactive problems caused by excessive signal propagation latency and clock skew. The later problem still is quite common even for real-time systems.

In addition, more and more PC application programs are providing audio services. This poses another problem for PCs operating in the Windows™ environment because Windows™ does not allow multiple application programs to "share" the audio hardware device through such operations as "mixing" (i.e. combining) audio streams provided by different application programs to produce a "composite" audio stream. Rather, Windows™ utilizes audio drivers which are dedicated to operate in cooperation with only one application program at a time. For example, if a first application program 115a "opens" the audio driver 120 for use in mapping an audio stream from one format into another format used by the audio hardware device 125, the remaining application programs 115b–115n are precluded from using the audio driver 120 until it is "closed". Subsequently, the audio driver 120 may be "re-opened" by the same application program 115a or opened by a different application program 115b–115n. Thus, PCs with conventional audio drivers supplied by third party hardware vendors are typically precluded from providing a "composite" audio stream representing two or more sounds occurring simultaneously.

As a result, many hardware vendors have been introducing audio drivers with sophisticated software mechanisms in order to provide "composite" audio. However, such a solution presents a number of disadvantages. First, it places excessive burden on the hardware vendors to provide more and more complicated software audio drivers to maintain compatibility between Windows™ and their specific type of audio hardware device. Moreover, it causes common audio features (e.g., volume control) to be repeatedly coded into each hardware vendor's audio driver. This repetitive effort unnecessarily raises the overall costs of the audio hardware devices. Moreover, as the complexity and number of audio drivers increases, it becomes more difficult to fully coordinate the operations of numerous application programs with multiple audio hardware devices in order to avoid synchronization and clock skew problems. Although these above-mentioned disadvantages are discussed in connection with audio, they are applicable to any type of media supported by PCs such as video or text.

In light of the foregoing, it is appreciated that there exists a need to design and develop a communication scheme which would enable a PC operating in a non-real-time environment (e.g., Windows™) to support at least one multi-media application program without experiencing interactive problems caused by synchronization or clock skew or modifying Windows™ and/or prior Windows-based application programs.

BRIEF SUMMARY OF THE INVENTION

The present invention is the implementation of a real-time media driver within a non-real-time environment in order to establish and control real-time transmissions of a plurality of media streams between the multi-media application programs and a media hardware device. The real-time media driver comprising (i) a wave driver; (ii) a media scheduler and (ii) a mini-device driver. The wave driver, electrically coupled between legacy Windows-based application programs and the media scheduler, create tasks operating within the media scheduler to control propagation of the media streams resulting from the legacy Windows-based application programs during "playback" communications. During "record" communications, the wave driver receives media streams from certain tasks in the media scheduler and converts these media streams into a format readable by the Windows-based application programs.

The media scheduler is electrically coupled to the wave driver and/or future application programs incorporating the wave driver functionality thus possibly excluding necessity of the wave driver. During the "playback" communication, the media scheduler receives media streams, controls the timing, synchronization and reconfiguration of these media streams and mixes these media streams, according to a predetermined priority sharing protocol, to produce a composite stream. During "record" however, converse operations occur.

Finally, the mini-device driver, electrically coupled to the media scheduler and the media hardware device, controls the transmission of media forming the composite media stream into the media hardware device during "playback" communication. During "record" communication, the mini-device driver samples media from the media hardware device and produces a composite stream for transmission to the media scheduler for "splitting" and thereafter, to appropriate Windows-based applications.

BRIEF DESCRIPTION OF THE DRAWINGS

The features and advantages of the present invention will become apparent from the following detailed description of the present invention in which.

DETAILED DESCRIPTION OF THE INVENTION

The detailed description which follows is presented largely in terms of illustrative block diagrams and flowcharts describing devices used to enable a PC to effectively run multi-media applications in a non-real-time (e.g., Windows™) environment. These devices are generally conceived as hardware or software performing a sequence of steps leading to a desired result in which each step requires physical manipulation of physical quantities. Usually, but not necessarily, these quantities are a sequence of electrical or magnetic signals containing information, commonly referred to as a "bits", which are capable of being stored, transferred, compared, combined or otherwise manipulated. These illustrative block diagrams and flowcharts are the means used by those skilled in computers to most effectively convey the essence of their work to others skilled in the art.

In the detailed description, a number of terms are frequently used to describe certain block representations and bit representations which are defined herein. A "task" is a sequence of instructions ("program") for performing operations which controls the propagation of media between devices. A "virtual" element is a software abstraction (i.e., copy) of that element. For example, a "virtual device" is a software copy of a media hardware device which manages the use of that media hardware device. A "block" is generally defined as a predetermined number of information bits transferred in one or more sequential clock cycles while a "stream" is defined as a continuous transmission of blocks to a given device.

Figure 2:
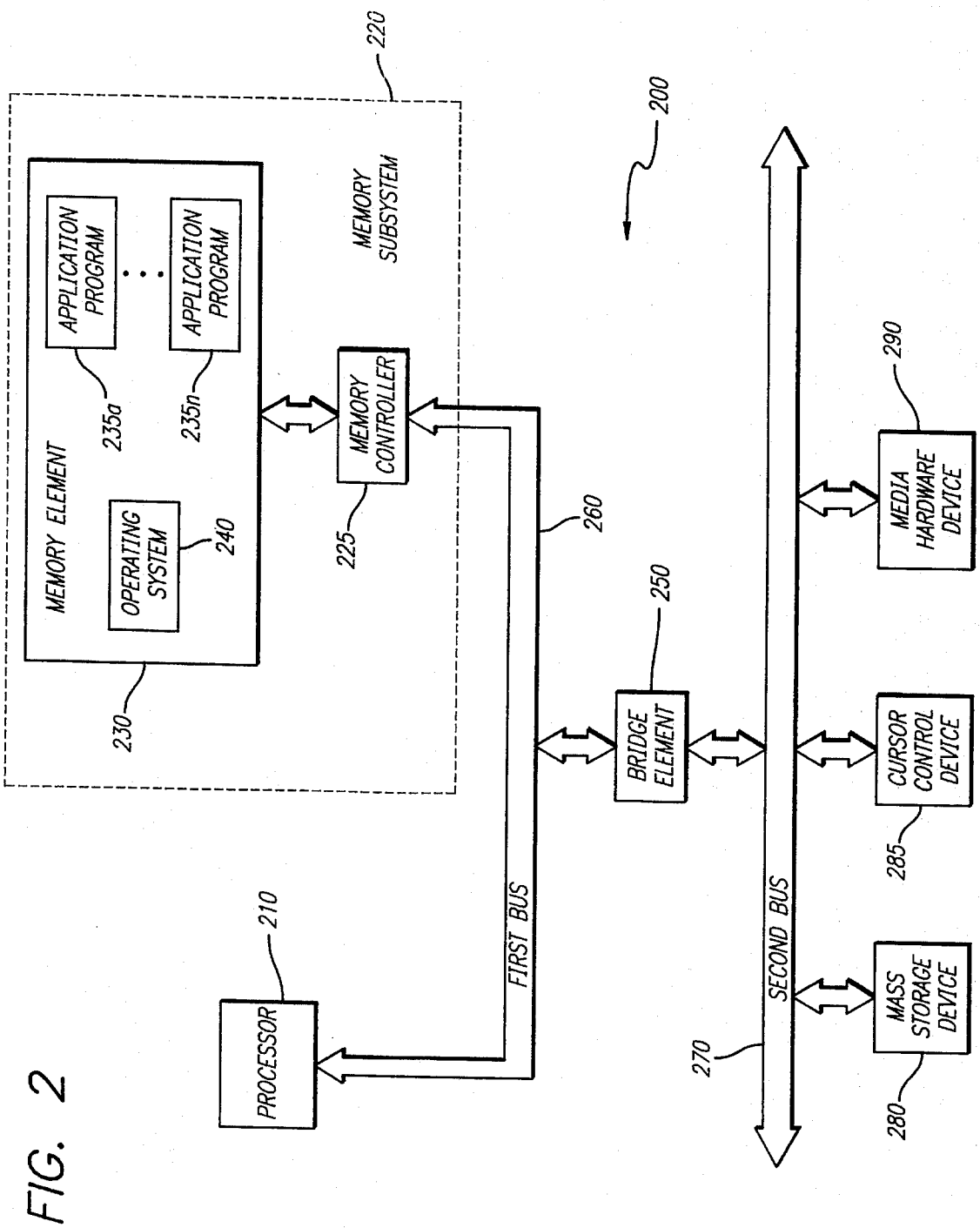
FIG. 2 is an illustrative block diagram of one embodiment of a computer system employing the present invention.

Referring to FIG. 2, an illustrative embodiment of a computer system 200 utilizing the present invention is shown. The computer system 200 comprises a number of devices including, but not limited to a processor 210, a memory subsystem 220 and a bridge element 250. These devices are coupled together through a first bus 260 which includes data, address and control lines. The memory subsystem 220 includes a memory controller 225, coupled to the first bus 260, providing an interface for controlling access to at least one memory element 230 such as dynamic random access memory ("DRAM"), read only memory ("ROM"), video random access memory ("VRAM") and the like. The memory element 230 may store an arbitrary number "n" of application programs 235a–235n, a non-real-time operating system 240 and/or other related systems or programs used by the processor 210. The non-real-time operating system 240 manages most interactions between software and hardware devices within the computer system 200.

The bridge element 250 operates as an interface between the first bus 260 and a second bus 270 (e.g., PCI, ISA or EISA bus) by providing a communication path enabling the operating system 240 to control peripheral devices, coupled to the second bus 270, accessing or transferring information to the memory subsystem 220 or the processor 210. These peripheral devices include, but are not limited to a mass storage device 280 (e.g., magnetic tapes, hard disk drive, floppy disk drive, etc.) storing application programs and other information, a cursor control device 285 (e.g., alphanumeric keyboard, mouse, track ball, touch pad, joystick, etc.) and at least one media hardware device 290. The media hardware device 290 may include an audio hardware device (e.g., an audio code coupled to a microphone, speaker, headset, etc.) for recording or playback of audio information, a video hardware device (e.g., video camera, display monitor, etc.) for recording or playback of video information and the like.

It is contemplated that the computer system 200 may employ some or all of these components or different components than those illustrated. For example, the computer system may employ another bridge element coupling a high speed serial bus to the first bus 260, wherein the media hardware device 290 could be coupled to this serial bus.

Figure 3:
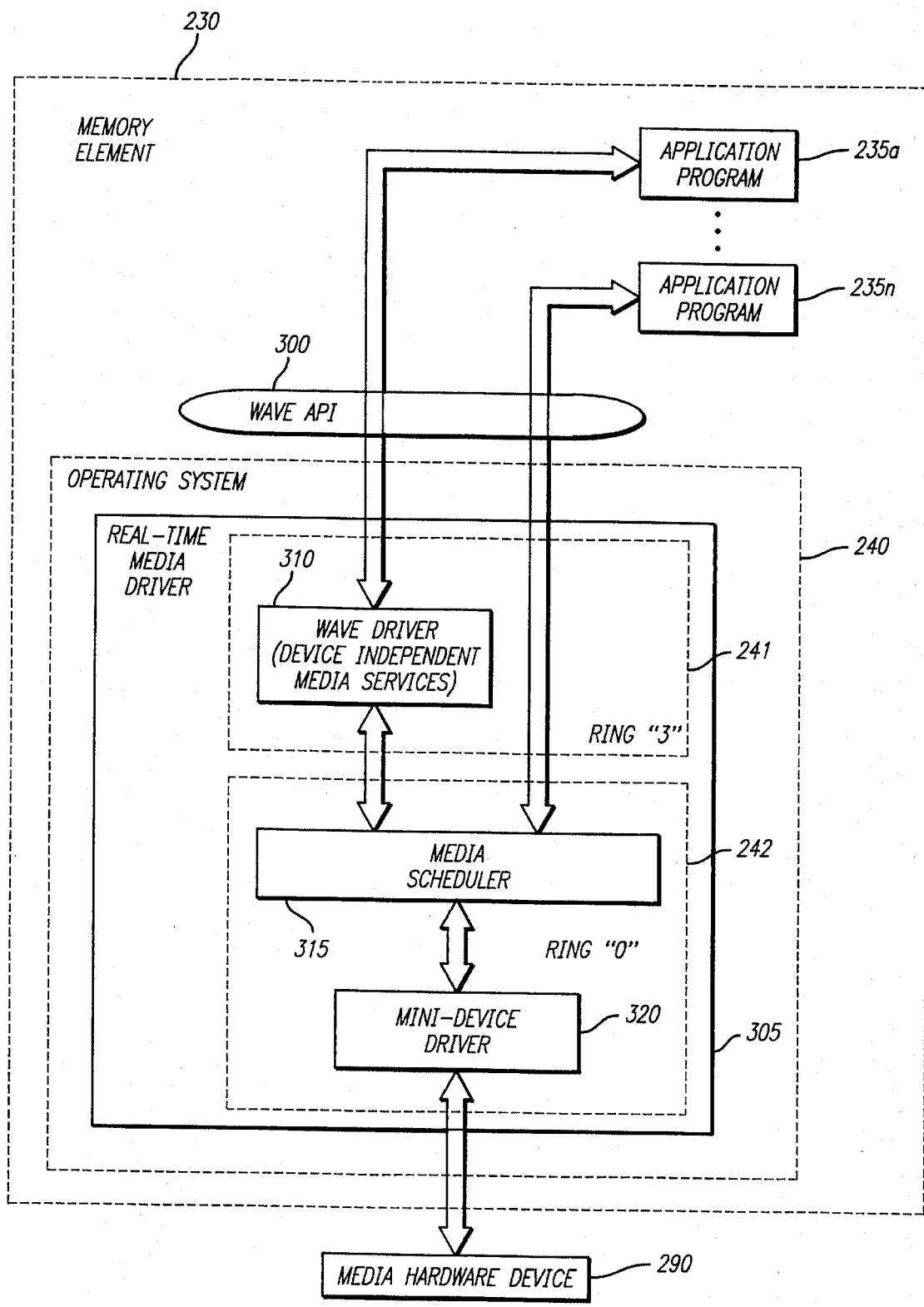
FIG. 3 is an illustrative block diagram of the communication path of the operating system of FIG. 2 including a real-time media driver.

Referring now to FIG. 3, an illustrative block diagram of both "record" and "playback" communication paths established by a real-time media driver 305 to transfer media from and to the media hardware device 290. In general, along the "record" communication path, the real-time media driver 305 samples media from the media hardware device 290. Then, the real-time media driver 305 performs a number of operations on these media samples as required by different interfaces employed throughout the real-time media driver 305, including such operations as modifying the media stream's format (i.e., altering some of its attributes), altering its bit length and the like. Thereafter, the real-time media driver 305 transmits one or more media streams having a format according to a Wave API 300 into the application programs 235a–235n.

For the "playback" communication path, however, the real-time media driver 305 receives a media stream from at least one application program 235a–235n and performs appropriate operations on the media stream (e.g., format alterations, mixing the media stream with another to produce a composite stream, formatting the composite stream, etc.). The real-time media driver 305 converts this composite media stream into a number of media samples which are input into the media hardware device 290 for sound, video or other type of media production. Although the real-time media driver 305 supports both "record" and "playback" communication paths, for clarity sake, only the operations associated with the "playback" communication path shall be discussed.

As specifically shown in FIG. 3, the non-real-time operating system 240 (preferably Windows™) includes the Wave API 300 which provides a standard interface for at least one of the plurality of application programs 235a (e.g., legacy application programs) to transfer a media stream, having a format dictated by the Wave API 300, into the real-time media driver 305. The real-time media driver 305 comprises a wave driver 310, a media scheduler 315 and a mini-device driver 320. It is contemplated that at least one of these plurality of application programs (e.g., a future application program 235n) may be configured to set up tasks within the media scheduler 315 to receive information directly from the application program 235n rather than being propagated through the wave driver 310.

The wave driver 310, residing in a non-modifiable, protected environment "Ring 3" 241 of the operating system 240, receives the media stream as input from at least one application program, normally a legacy Windows-based application program. The wave driver 310 creates a task (e.g., "audio task 1" 400a of FIG. 4) to "play" the media stream and transfers information associated with this media stream to the task within the media scheduler 315. It is contemplated that the wave driver 310 may also convert the media stream into a format readable by a mini-device driver 320. In any event, these services provided by the wave driver 310 are independent from the specific configuration of the media hardware device 290 of FIG. 2.

The media scheduler 315, residing an unprotected environment "Ring 0" 242 of the operating system 240 and operating in cooperation with the wave driver 310, controls timing, synchronization and transformations of the media stream before it is transmitted to the mini-device driver 320. These transformations are directed to specific attributes of the media stream constituting its "format" (e.g., media "quality" evident through sample rate and channel number, size constraints of data structures supported by the media stream, etc.). Thereafter, the mini-device driver 320, implemented as a virtual driver (32-bit portable executable in Windows™ environment) converts this media stream into media samples and transfers these samples to the media hardware device 290.

Figure 4:
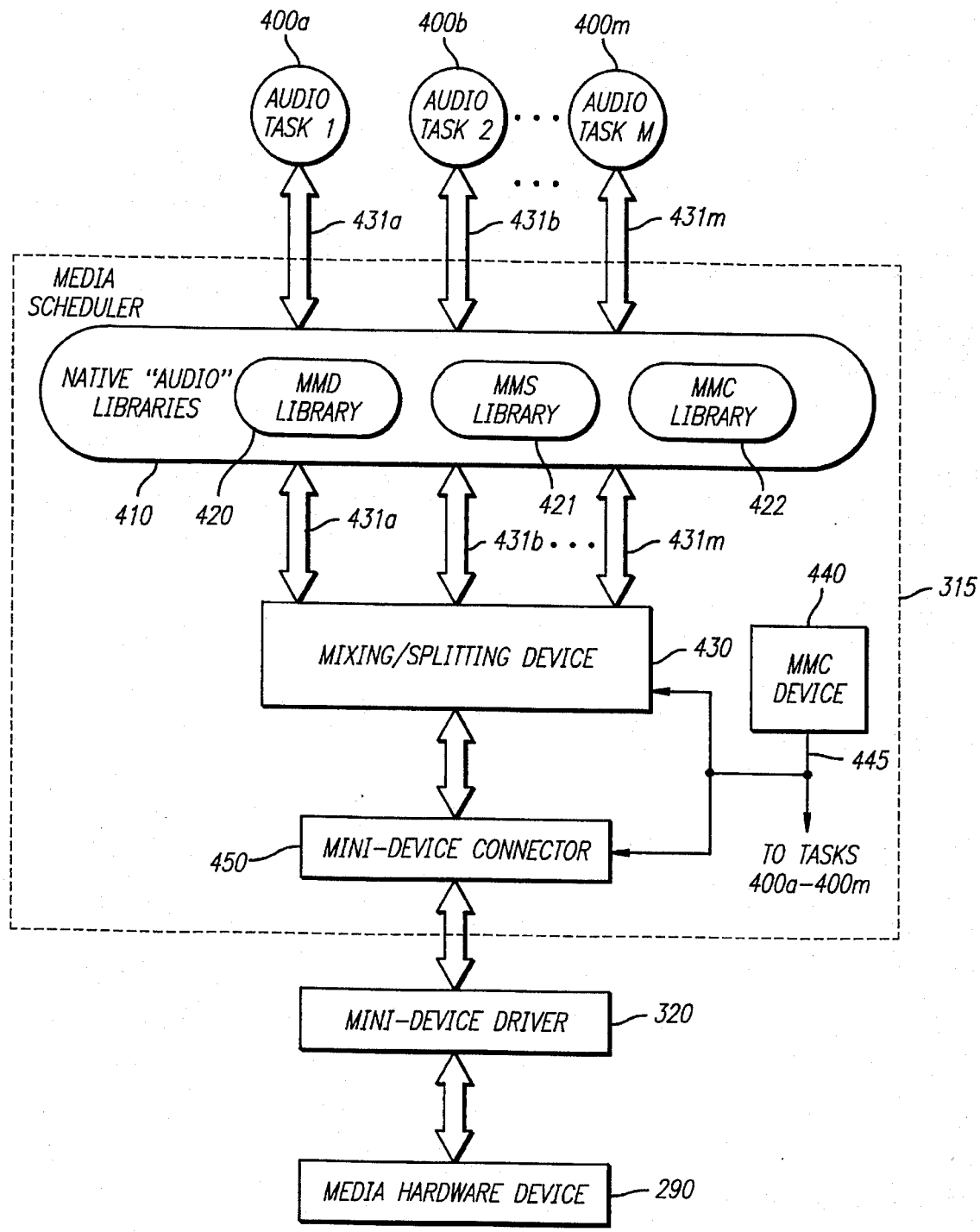
FIG. 4 is an illustrative block diagram of an embodiment of the real-time media driver of FIG. 3.

Referring now to FIG. 4, one embodiment of the media scheduler 315 is shown in which it schedules audio streams, produced by a plurality of audio tasks 400a–400m, to produce a composite audio stream. It is contemplated, however, that the media scheduler 315 may be configured for mixing other types of media to produce a multi-media stream. In this embodiment, the media scheduler 315 comprises native audio libraries 410, a mixing/splitting device 430, a multi-media clocking ("MMC") device 440 and a mini-device connector 450. It is contemplated that intermediary devices (e.g., filters) may be employed between the native libraries 410 and the mixing/splitting device 430 to alter sampling rate, provide compression and the like or between the mixing/splitting device 430 and the mini-device connector 450 to reduce echo or noise, provide compression (e.g., μLaw) or media enhancement.

Figure 1:
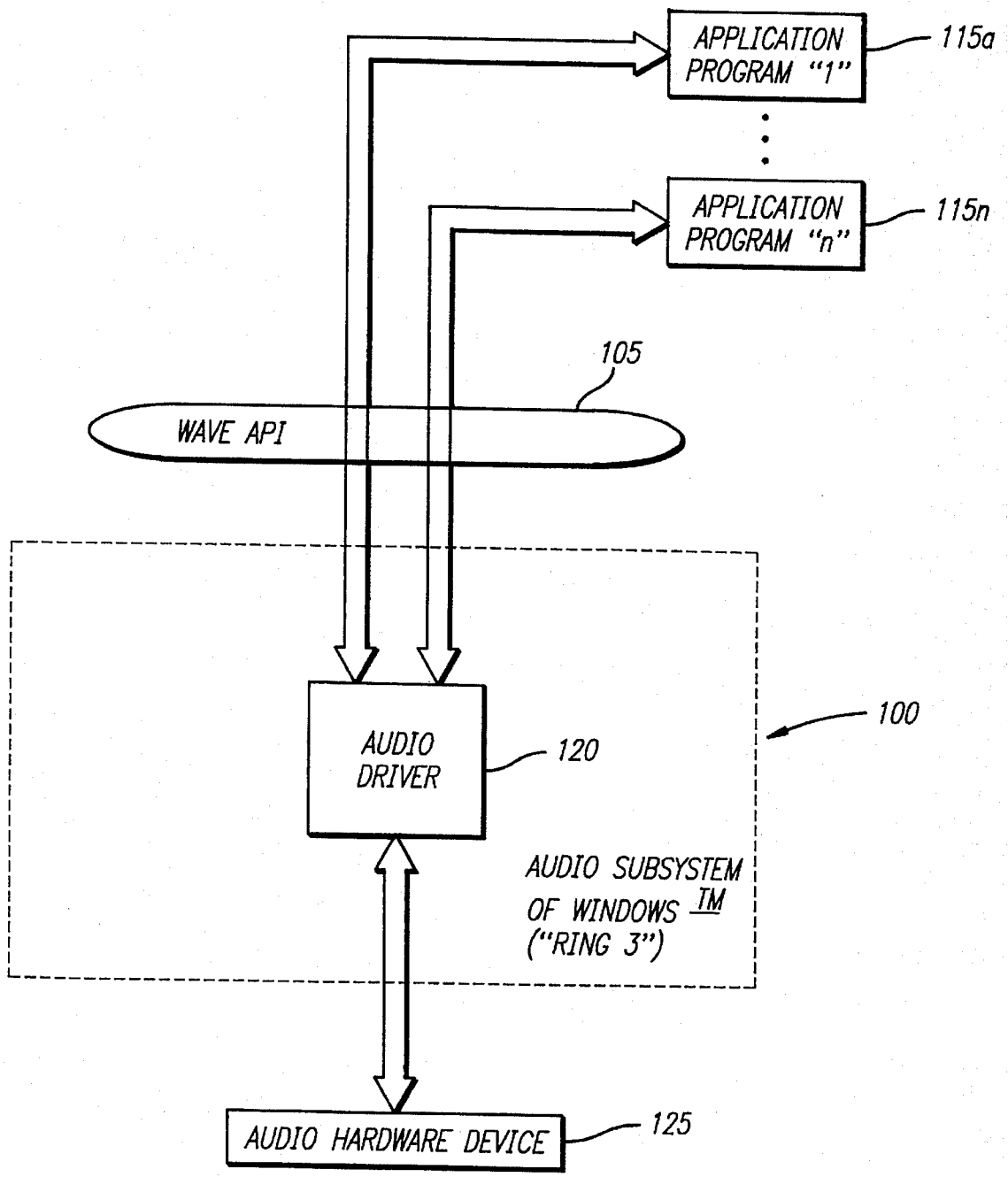
FIG. 1 is a block diagram of a conventional communication path between conventional multi-media application programs and a non-real-time operating system.

The plurality of audio tasks 400a–400m ("m" being arbitrary) in combination with the native audio libraries 410 create multiple audio streams 431a–431m and control the propagation of the audio streams into the mixing/splitting device 430. More particularly, the native audio libraries 410 provide a set of interfaces at "Ring 0" to enable an audio task within the media scheduler 315 to control timing, synchronization and dynamic transformations of its audio stream, in contrast with the current programmatic interfaces of the audio driver (see FIG. 1) available in "Ring 3" of Windows™. This set of interfaces collectively provides access to at least three libraries; namely, a multi-media device ("MMD") library 420, a multi-media stream ("MMS") library 421 and a multi-media clock ("MMC") library 422 as discussed below in reference to Tables A–C.

The MMD library 420 is a set of functions for creating and controlling a virtual device associated with the media hardware device 290. An inexhaustive list of functions supported by the MMD library 420 is shown in Table A below.

TABLE A

| Examples of Functions Supported by the MMD Library | |
|---|---|
| Function Name | Characteristics |
| MMD_createNewDevice( ) | Creates and opens a new virtual device for with the media hardware device. |
| MMD_queryDeviceInterface( ) | Asks the media hardware device what type of interface it supports. |
| MMD_addDeviceReference( ) | Informs the virtual device that another task is permitted to communicate with the media hardware device. |
| MMD_releaseDevice( ) | Stops a task from having access to the media hardware device. |

The MMS library 421 is another set of functions for creating and controlling media streams, including audio streams propagating through the media scheduler 315 before being input into the mini-device connector 450. An inexhaustive list of these functions is shown in Table B below.

TABLE B

| Examples of Functions Supported by the MMS Library | |
|---|---|
| Function Name | Characteristics |
| MMS_createNewStream( ) | Creates a "disconnected" media (audio) stream and initializes its static parameters. |
| MMS_connectStream( ) | Connects the media (audio) stream and defines it's format prior to transmission to the media hardware device. |
| MMS_disconnectStream( ) | Prepares the media (audio) stream for format changes. |
| MMS_insertDevice( ) | When "disconnected", this function causes an intermediary device to be inserted into a communication path of the media (audio) stream. |
| MMS_removeDevice( ) | During "disconnect" state, this function causes an intermediary device to be removed from the communication path of the media (audio) stream. |
| MMS_reclaimBlock( ) | Retrieves media (audio) and its associated control information from the audio stream. |
| MMS_issueBlock( ) | Inputs media (audio) and associated control information into the audio stream. |

The MMC library 422 is a set of functions necessary to create a virtual clocking device to interface with a task in order to provide sufficient clocking to support multiple events. An inexhaustive list of these functions is shown in Table C below.

TABLE C

Examples of Functions Supported by the MMC Library

| Function Name | Characteristics |
| --- | --- |
| MMC_createNewClock( ) | Creates and initializes a new multi-media clock. |
| MMC_getActualTime( ) | Returns the current actual time relative to the specific time base |

Figure 5:
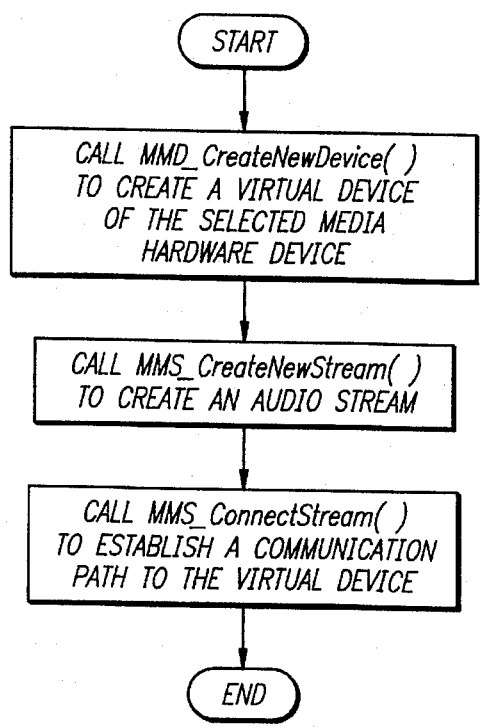
FIG. 5 is a flowchart illustrating a communication path of the audio stream to the mini-device driver.

The transmission of audio from the tasks to the mini-device driver is accomplished as shown in FIG. 5. First, a task selects a media hardware device to receive audio by calling MMD_createNewDevice(). This function creates a virtual device of the media hardware device for dedicated use by the task (Step 105). The virtual device is referenced by a handle (i.e., pointer to a given address location).

After receiving the handle addressing the media hardware device, the task creates an audio stream by calling MMS_createNewStream() (Step 110). This audio stream is created with certain basic attributes defined by parameters of MMS_createNewStream() including its transmission direction, a chosen "prioritized" sharing" policy (discussed with respect to FIG. 7), the clocking source of the audio stream to prevent clock skew and to promote synchronization as well as any other desired attributes.

After creating the audio stream, the task calls a connect function "MMS_connectStream()" which provides a communication path from the task to the virtual device of the media hardware device and defines the format structure that the task will use to transfer an audio stream to the virtual device (Step 115). Thereafter, the task may reserve memory space and prepares for the transfer of the audio stream.

As briefly discussed in reference to the MMS library, it is apparent that the process for creating an audio stream is unrelated and separate from the process of providing a communication path for appropriately transmitting the audio stream to the virtual device of the media hardware device. This enables a task controlling the audio stream to momentarily pause transmission and dynamically reconfigure the audio stream without losing the content of the audio stream altogether.

Figure 6:
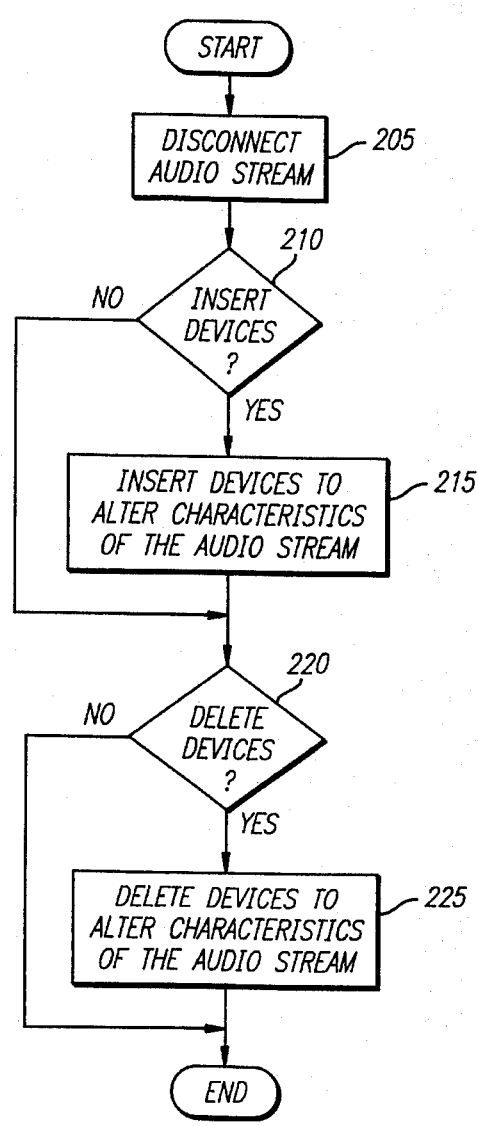
FIG. 6 is a flowchart indicating the procedural operations necessary to dynamically reconfigure an audio stream.

For example, there may exist instances where an audio stream having a first set of attributes (e.g., audio quality, volume level, etc.) is being transmitted to the media hardware device. However, during its transmission, the media hardware device may require audio having a second set of attributes different than those previously transmitted. The task (or tasks) producing the audio stream with the first set of attributes may be appropriately altered by following the operational steps shown in FIG. 6.

First, in Step 205, the task disconnects the audio stream from the media hardware device. This is accomplished by the task calling the MMS_disconnectStream() function. Thereafter, the task may call the MMS_insertDevice() function to insert intermediary devices into the communication path of the audio stream to vary its attributes (Step 210–215). Likewise, the task may call the MMS_removeDevice() function to remove any intermediary devices from the communication path of the audio stream (Step 220–225). Upon completion, the task issues the MMS_connectStream() call to enable the audio stream to continue propagating into its respective media hardware device.

Figure 7:
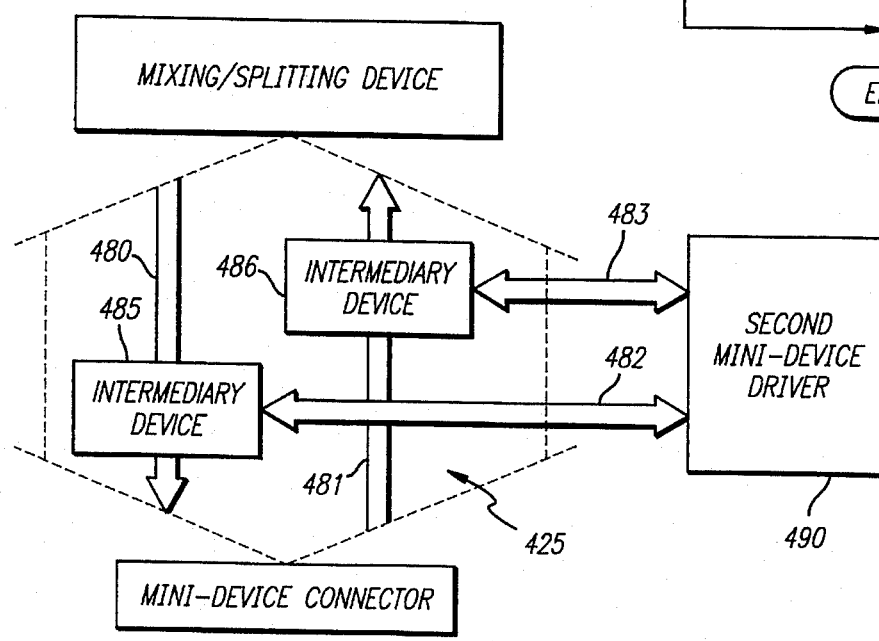
FIG. 7 is an illustrative block diagram of a conversation tap employed along the communication paths between the mixing/splitting device and the mini-device connector.

It is contemplated that providing a dynamic reconfigurable audio stream overcomes another problem associated with being able to provide full-duplex monitoring of media streams transferred through the real-time media driver during a video conference. More specifically, as shown in FIG. 7, a conversation tap 475 may be inserted into a communication path 425 (see also FIG. 4) between, for example, the mixing/splitting device 430 and the mini-device connector 450; namely, along both uni-directional "playback" and "record" communication paths 480 and 481 of audio streams transferred to and from the media hardware device.

The conversation tap 475 is a device having a pair of intermediary device 485 and 486 (e.g., filters being software algorithms for monitoring purposes) inserted within the communication paths 480 and 481, respectively. These intermediary devices 485 and 486 produce additional communication paths 482 and 483 for the audio streams propagating along the communication paths 480 and 481. The conversation tap 475 further includes a second mini-device driver 490 coupled to the additional communication paths 482 and 483 to allow a media hardware device coupled to the second mini-device driver 490 to record or inject audio (e.g., background music) from or into any of these audio streams.

Figure 8:
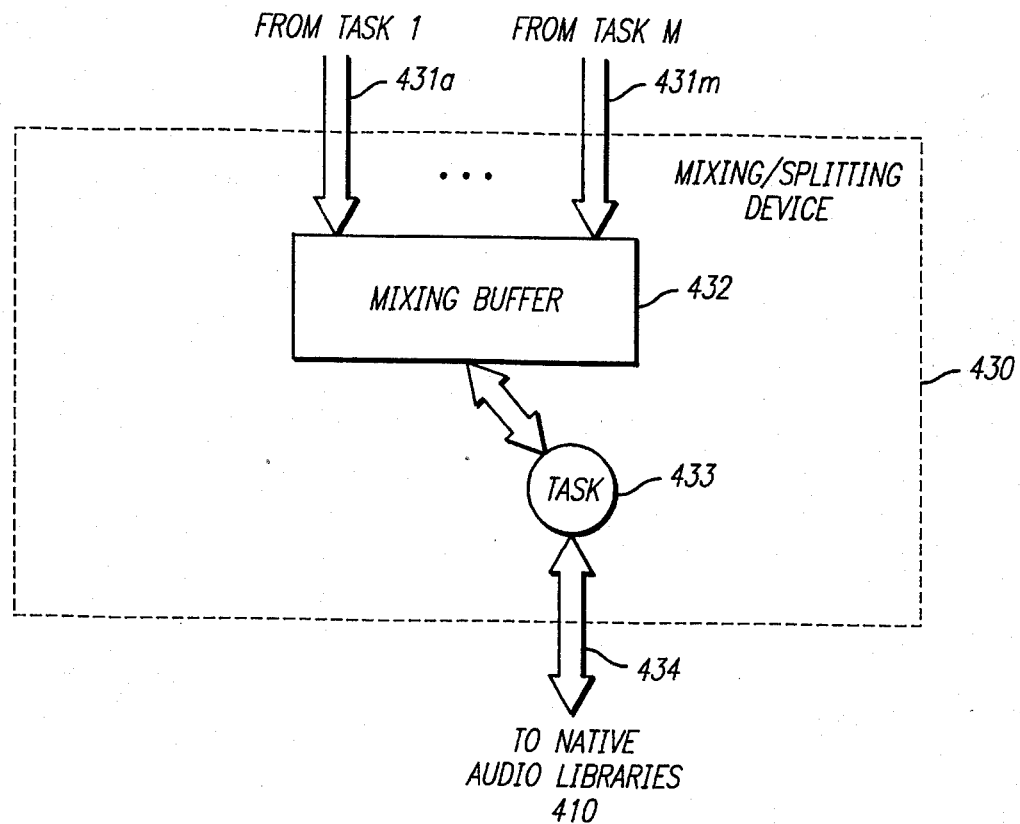
FIG. 8 is an illustrative block diagram of the mixing/splitting device of FIG. 4.

Referring now to FIG. 8, the audio streams are output from the native audio libraries 410 into the mixing/splitting device 430 comprising a mixing buffer 432 being controlled by an internal mixing task 433. Upon being "opened", the mixing task 433 provides the MMS library various attributes that the mixing/splitting device 430 can support based on its chosen configuration. These attributes include, but are not limited to (i) audio "quality" defined by sample rate and channel number (mono, stereo, etc.) and (ii) mixing buffer size. The plurality of tasks access the MMS library to read these attributes in order to modify their audio streams 431a–431m in compliance with the attributes supported by the mixing/splitting device 430. This is accomplished by the tasks inserting and/or deleting various intermediary devices into the communication path of their respective audio streams 431a–431m as described above.

During every clock cycle of a virtual clock provided by the MMC device (discussed in FIG. 9), the mixing buffer 432 stores audio blocks transmitted through the plurality of audio streams 431a–431m. The addressing of these audio blocks is controlled by the mixing task 433. In addition, prompted by block transfer requests initiated by the mini-device driver, the mixing task 433 obtains these audio blocks according to a first-in, first-out ("FIFO") protocol and "mixes" these audio blocks to produce a composite audio stream transmitted to the native audio libraries 410 via communication path 434 for subsequent transmission to the mini-device connector. This mixing is performed by any one of well-known "prioritized sharing" policies including, but not limited to (i) fixed priority (audio streams transmitted during identical clock cycles receive equal attributes e.g., volume, etc.); (ii) time-based priority (most recently transmitted audio streams receive more pronounced attributes); (iii) exclusive priority (one task has sole use of mixing/splitting device 430); and (iv) preemptive priority (initiating task receives "exclusive" priority, provided no other task has "exclusive" priority).

Figure 9:
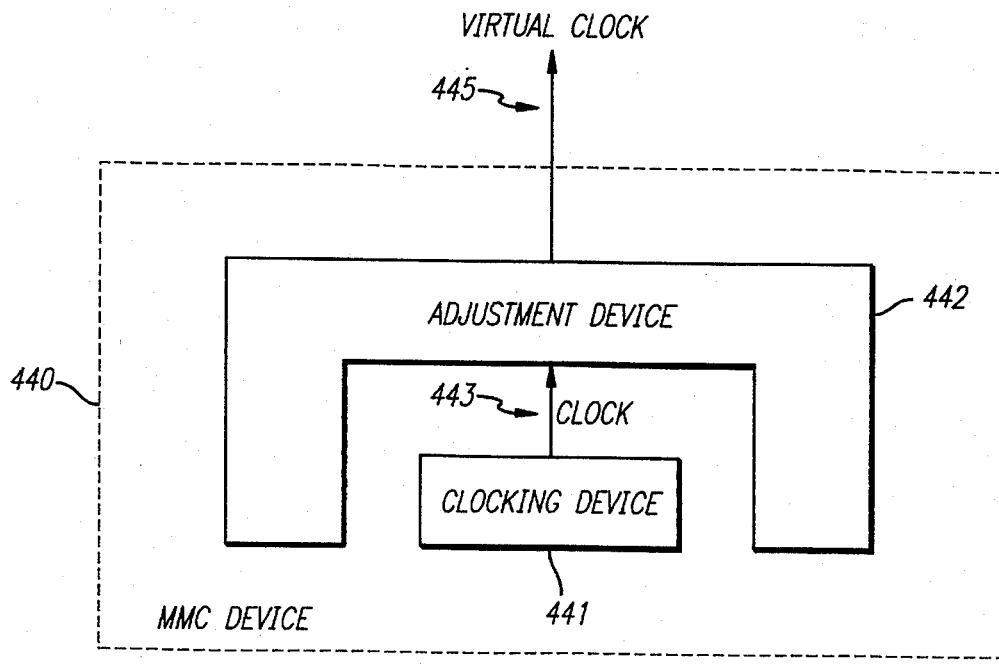
FIG. 9 is an illustrative block diagram of an embodiment of the MMC device of FIG. 4.

Referring now to FIG. 9, the MMC device 440 comprises a high precision clocking device (e.g., PC timer) 441 working in cooperation with an adjustment device 442 to synchronize and "temporally align" multiple media streams based on different clock sources and eliminate any subsequent clock skew between these multiple media streams. The high precision clocking device 441 continually transmits a clock signal 443 at a predetermined clock rate into the adjustment device 442. The adjustment device 442, being software or hardware, tracts the clock signal 443 and appropriately adjusts its rate before being output from the MMC device 440 as a modifiable "virtual" clock 445. This "virtual" clock 445, distributed to each of the plurality of tasks 400a–400m, the mixing/splitting device 430, mini-device connector 450 and any intermediary devices (as discussed), enables the computer system to overcome clock skew inherent in media streams originating from devices being clocked by different oscillating crystals.

In addition, the "virtual" clock 445 may be required to synchronize media streams propagating through the real-time service driver 305 with a clock source of a remote communication system (e.g., ISDN connections) inputting information into the real-time media driver 305 via a serial port, local area network or a telephone. Such synchronization may be accomplished by configuring a task associated with the remote communication system to notify the MMC device 440 when a media transfer should occur between the task and the remote communication system. Thus, the virtual clock 445 may be adjusted to cycle at a rate of the clock source. For asynchronous media transfer, the MMC device 440 is configured to account for delivery deviations by averaging the frequency of these audio transfers.

Referring back to FIG. 4, the mini-device connector 450 provides at least an audio interface between the mixing/splitting device 430 and the mini-device driver 320. The mini-device connector 450 controls the transfer rate of blocks of media exchanged between the mixing/splitting device 430 and the mini-device driver 320 by detecting transfer rate discrepancies required by these devices and correcting for these discrepancies. Such correction may be performed by a well-known "Time Scale Modification" algorithm in which the number of audio samples is decreased or increased in order to compensate for rate differences. It is contemplated that less accurate procedures may be used to coordinate transfer rates. Software algorithms may be implemented to analyze the audio and perform appropriate corrections. For example, sound levels of each digital audio sample may be monitored and those samples having "low" sound levels below a certain decibel range may be deleted or incremented in order to equate media transfer rates.

Although not shown, the mini-device connector 450 may further include a control interface which allows the hardware vendors to list and describe various control functions supported by their media hardware devices. This enables the hardware vendors to specify control for additional enhancement features to the media hardware devices such as volume and configuration.

Referring still to FIG. 4, the mini-device driver 320 enables Windows-based application programs 235a–235n to communicate with its associated media hardware device 290, taking advantage of the functionality of the media scheduler 315, namely the native audio libraries. The mini-device driver 320 provides only hardware-dependent functions, contrary to the wave driver 305 of FIG. 3 which supplies generic, hardware-independent media processing services and calls the device-specific functions of the mini-device driver 320 as needed to record, playback or control a media stream through the media hardware device. Thus, hardware vendors of the media hardware device need only write a minimum amount of code specific to its unique features.

Figure 10:
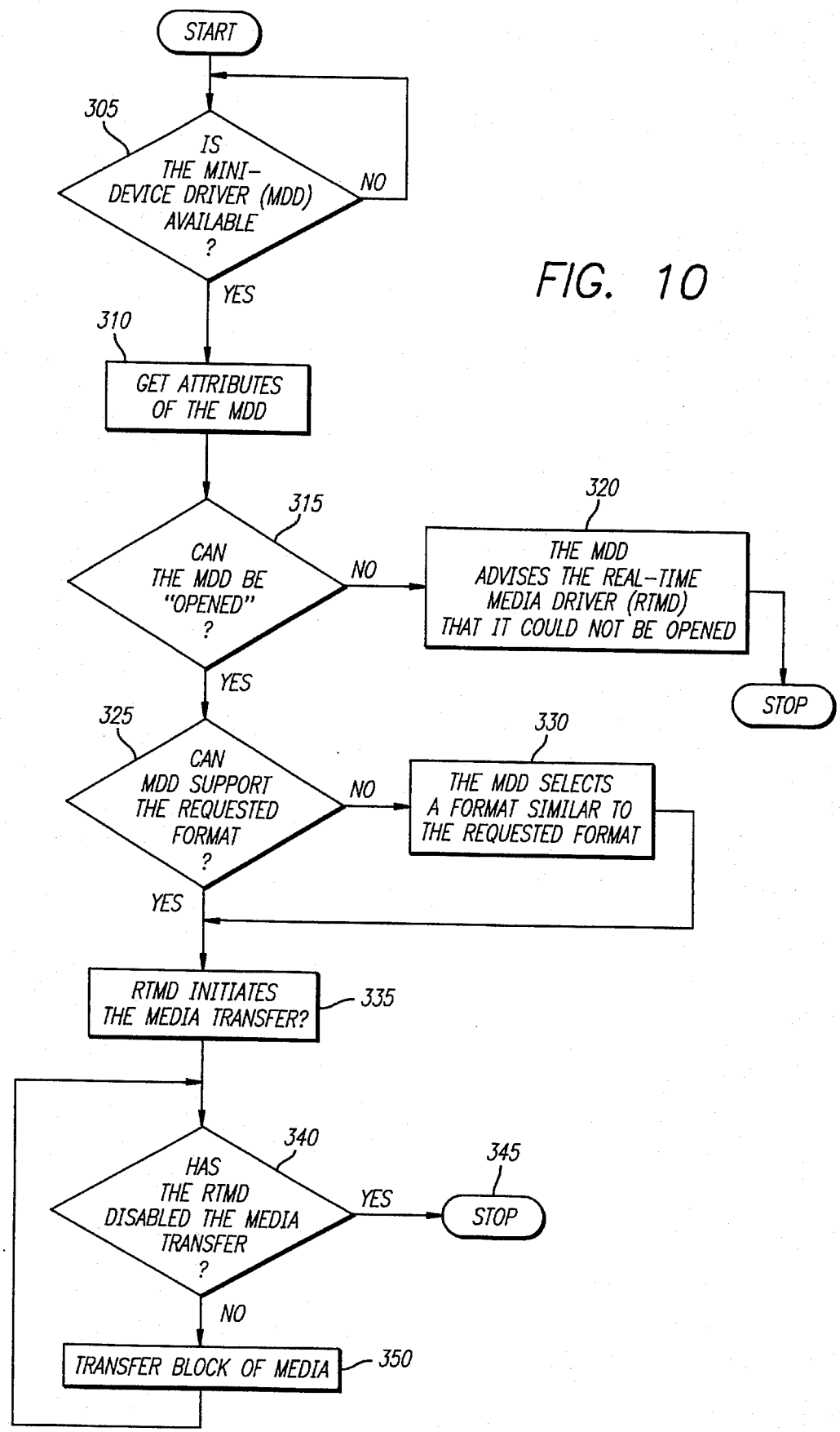
FIG. 10 is a flowchart of operations performed by the mini-device driver of FIG. 4.

The mini-device driver 320 in cooperation with the media scheduler 315 performs four operational steps identified in FIG. 10 to order to support media transfers. The operational steps may be performed repetitively while the mini-device driver is "open". For example, media transfer may be started and stopped multiple times. Similarly, the mini-device driver 320 may be "opened" and "closed" multiple times during a single communication session.

The first operational step performed by the mini-device driver is to inform the real-time media driver whether it is available for use (Step 305). This may be accomplished by the mini-device driver transmitting function calls to the real-time media driver such as those illustrated in Table D.

TABLE D

| Function Name | Characteristics |
| --- | --- |
| VMMRD_notifyArrival( ) | The mini-device publicly announces that its services are available. |
| VMMRD_notifyDeparture( ) | The mini-device calls this function to publicly announce that its services are no longer available. |

Typically, the mini-device driver calls VMMRD_notifyArrival() as soon as the mini-device driver is loaded and initialized. Moreover, the function "VMMRD_notifyDeparture" should be called when the mini-device driver is not in a state to support services.

In response to the mini-device driver announcing its availability, the real-time media driver issues a "GetAttributes" function call to all mini-device drivers (Step 310). The "GetAttributes" function call may be used to determine which mini-device driver to use.

After determining the appropriate mini-device driver, the real-time media driver may issue an "OpenMiniDevice" call which asks the mini-device driver if it can be "opened" and provides certain attributes pertaining to the media stream (Step 315). Examples of such attributes includes operation mode (Play, Record, etc.), format of the media stream (transfer rate in digital samples per second, number of channels, block size, etc.) and a suggested buffer size to be processed by the mini-device driver.

In the event that the mini-device driver cannot process the information, the mini-device driver informs the real-time media driver that the "OpenMiniDevice" call failed (Step 320) as the application is notified. However, if the mini-device driver can process the information, it checks to see if it can support the requested format and if not, selects the most similar format (Steps 325–330).

As an illustrative example, suppose that a media hardware device (e.g., an audio hardware device), opening its corresponding mini-device driver, requests a format of 16-bit Pulse Code Modulated ("PCM") audio at 8 KHz mono and with a block size of 512 bytes. In this format, it would take approximately 32 milliseconds to play the audio block. If the mini-device driver can only open with a format of 8-bit PCM audio at 8 KHz mono, then the mini-device driver should not only modify the format selection, but also the block size. According to this example, the mini-device driver should select a block size as close to 256 bytes as possible.

By selecting the block size of 256 bytes instead of 512 bytes, the mini-device driver is matching the playtime of the original buffer (32 milliseconds), instead of the physical buffer size. Selecting a block size that is too large introduces unacceptable delays, while selecting too small a block size causes unnecessary overhead. The mini-device driver may remain "open" when no more media is provided or may be closed by the mini-device driver upon its issuing a "CloseMiniDevice" call after a series of media streams or each media stream.

Thereafter, the real-time media driver enables media transfer by passing a first block of media to the mini-device driver through issuance of a "StartIO" call (Step 335). The mini-device driver directs the transfer of media between the real-time media driver and the media hardware driver through "TransferNextBlock" calls (Step 350). This continues until the real-time media driver disables media transfer by issuing a StopIO call (Steps 340–345).

The present invention described herein may be designed using many different configurations or slightly different process steps. While the present invention has been described in terms of various embodiments, other embodiments may come to mind to those skilled in the art without departing from the spirit and scope of the present invention. The invention should, therefore, be measured in terms of the claims which follow.

What is claimed is:

1. Implemented within a non-real-time environment to facilitate a real-time transfer of at least two media streams between a plurality of application programs and a media hardware device, a real-time media driver comprising:

a wave driver electrically coupled to the plurality of application programs;

a media scheduler coupled to said wave driver, said media scheduler capable of mixing information received from said at least two media streams in order to produce a composite media stream; and said mini-device driver electrically coupled to said media scheduler and the media hardware device, said mini-device driver controls a transfer of said composite media stream into said media hardware device.

2. The real-time media driver according to claim 1, wherein said media scheduler resides in modifiable, non-protected storage location in said memory element.

3. The real-time media driver according to claim 2, wherein said media scheduler includes a plurality of tasks controlling operations performed on said at least two media streams;

a set of native libraries electrically coupled to and operating in cooperation with said plurality of tasks, said set of native libraries assists said plurality of tasks to control timing, synchronization and dynamic transformations of said at least two media streams;

a mixing/splitting device electrically coupled to said set of native libraries through at least a first and second communication paths, said mixing/splitting device being capable of at least containing said at least two media streams and mixing said at least two media streams according to a predetermined prioritized sharing policy to produce said composite stream; and a mini-device connector electrically coupled to said mixing/splitting device, said mini-device connector provides an interface between said mixing/splitting device and said mini-device driver and controls a transfer rate of information exchanged between said mixing/splitting device and said mini-device driver.

4. The real-time media driver according to claim 3, wherein said mixing/splitting device includes a storage element to temporarily contain information from said at least two media streams in a chronological order; and a task electrically coupled to said storage element and said set of native libraries, said task configured to mix said at least two media streams according to said predetermined sharing policy to produce said composite stream to be transferred to said mini-device connector.

5. The real-time media driver according to claim 3, wherein said wave driver creates said plurality of tasks and converts each of said at least two media streams according to a format utilized by said mini-device connector.

6. The real-time media driver according to claim 5, wherein said wave driver resides in a non-modifiable, protected storage location in a memory element.

7. The real-time media driver according to claim 3 further comprising at least a first intermediary device placed along said first communication path in order to alter at least one attribute of a first of said at least two media streams.

8. The real-time media driver according to claim 3, wherein at least a first intermediary device is placed along said first communication path and at least a second intermediary device is placed along said second communication path, said first and second intermediary devices being used to monitor a media stream transferred along each of said first and second communication paths.

9. The real-time media driver according to claim 3 further comprising a multi-media clock device including a clocking device and an adjustment device, wherein said clocking device transmits a clock signal to said adjustment device which adjusts a clocking rate of said clock signal from a virtual clock signal, said virtual clock signal is used to synchronize and eliminate clock skew between said at least two media streams.

10. The real-time media driver according to claim 1, wherein said media scheduler is further configured to split a composite media stream into a plurality of media streams directed to the plurality of the application programs.

11. Implemented within a non-real-time environment to facilitate a real-time transfer of at least two media streams between a plurality of application programs and a media hardware device, a real-time media driver comprising:

wave means for creating a task to control the real-time transfer of the at least two media streams produced by the plurality of application programs, said wave means being electrically coupled to the plurality of application programs;

scheduler means for mixing information received from said at least two media streams according to a predetermined sharing policy in order to produce a composite media stream, said scheduler means being electrically coupled to said wave means; and driving means for controlling a transfer of said composite media stream into the media hardware device, said driving means being electrically coupled to said scheduler means and the media hardware device.

12. The real-time media driver according to claim 11 further comprising intermediary means for altering at least one attribute of a first of said at least two media streams propagating along a first communication path.

13. The real-time media driver according to claim 11 further comprising clock means for producing a virtual clock signal used by said scheduler means to synchronize and eliminate clock skew between said at least two media streams.

14. The real-time media driver according to claim 11, wherein said scheduler means is further configured for splitting a composite media stream into a plurality of media streams.

15. Utilizing a non-real-time operating system, a computer system comprising:

a first bus;

a memory subsystem including a memory controller coupled to said first bus and at least one memory element coupled to said memory controller, said at least one memory element contains a plurality of application programs, a non-real-time operating system and a real-time media driver implemented within said non-real-time operating system;

a second bus;

a media hardware device coupled to said second bus, said media hardware device being capable of requesting media from said real-time media driver for subsequent playback of said media; and a bridge element coupled between said first bus and said second bus, said bridge element allows information to be exchanged between said real-time media driver and said media hardware device.

16. The computer system according to claim 13, wherein said real-time media driver comprising:

a media scheduler mixing information received from said at least two media streams according to a predetermined prioritized sharing policy in order to produce a composite media stream; and a mini-device driver electrically coupled to said media scheduler and the media hardware device, said mini-device driver being capable of controlling a transfer of said composite media stream into said media hardware device.

17. The computer system according to claim 16, wherein said media scheduler of said real-time media driver resides in modifiable, non-protected storage location in said memory element.

18. The computer system according to claim 17, wherein said media scheduler includes a plurality of tasks controlling operations performed on said at least two media streams;

a set of native libraries electrically coupled to and operating in cooperation with said plurality of tasks, said set of native libraries assists said plurality of tasks to control timing, synchronization and dynamic transformations of said at least two media streams;

a mixing/splitting device electrically coupled to said set of native libraries through at least a first and second communication paths, said mixing/splitting device being capable of at least containing said at least two media streams and mixing said at least two media streams according to said predetermined prioritized sharing policy to produce said composite stream propagating through said first communication path; and a mini-device connector electrically coupled to said mixing/splitting device, said mini-device connector provides an interface between said mixing/splitting device and said mini-device driver and controls a transfer rate of information exchanged between said mixing/splitting device and said mini-device driver.

19. The computer system according to claim 18, wherein said mixing/splitting device of said real-time media driver includes a storage element to temporarily contain information from said at least two media streams in a chronological order and a task electrically coupled to said storage element and said set of native libraries, said task configured to mix said at least two media streams according to said predetermined prioritized sharing policy to produce said composite stream and producing said composite stream to be transferred to said mini-device connector.

20. The computer system according to claim 18, wherein said real-time media driver further comprising a wave driver electrically coupled to the plurality of application programs and said media scheduler, said wave driver creates at least one of said plurality of tasks.

21. The computer system according to claim 20, wherein said wave driver of said real-time media driver resides in a non-modifiable, protected storage location in a memory element.

22. The computer system according to claim 18, wherein said real-time media driver further comprising at least one intermediary device placed along said first communication path in order to alter at least one attribute of a first of said at least two media streams.

23. The computer system according to claim 18, wherein at least a first intermediary device is placed along said first communication path and at least a second intermediary device is placed along said second communication path, said first and second intermediary devices being used to monitor a media stream transferred along each of said first and second communication paths.

24. The computer system according to claim 18, wherein said real-time media driver further comprising a multi-media clock device including a clocking device and an adjustment device, wherein said clocking device transmits a clock signal to said adjustment device which adjusts a clocking rate of said clock signal to form a virtual clock signal, said virtual clock signal is used to synchronize and eliminate clock skew between said at least two media streams.

25. The computer system according to claim 16, wherein said media scheduler of said real-time media driver is configured to split a composite media stream into a plurality of media streams directed to the plurality of application programs.

26. Utilizing a non-real-time operating system, a computer system comprising:

memory means for storing a plurality of application programs, a non-real-time operating system and a real-time media driver implemented within said non-real-time operating system, said memory means being coupled to said first bus means;

media means for requesting media from said real-time media driver to support playback operations by said media means and for providing media to said real-time media driver for recording operations by said plurality of application programs;

first bus means for providing a communication link to said memory means;

second bus means for providing a communication link to said media means; and bridge means for allowing information to be exchanged between said real-time media driver and said media means, said bridge means being coupled between said first bus means and said second bus means.

27. Facilitating a real-time transfer of a plurality of media streams between a plurality of application programs operating in a non-real-time environment and a media hardware device, a method comprising the steps of:

producing a plurality of tasks to initiate and control said plurality of media streams generated by the plurality of application programs;

mixing media contained within said plurality of media streams according to a predetermined sharing policy in order to produce a composite media stream; and controlling propagation of said composite media stream into said media hardware device.

28. The method according to claim 27, wherein prior to said mixing step, the method further comprises the step of synchronizing said plurality of media streams.

29. The method according to claim 28, wherein prior to said synchronizing step, the method further comprises the step of reconfiguring at least one attribute of at least one of said plurality of media streams.

30. Implemented within a non-real-time environment to facilitate a real-time transfer of at least two media streams between a plurality of application programs and a media hardware device, a real-time media driver comprising:

a media scheduler being configured (i) to mix information received from said at least two media streams according to a predetermined prioritized sharing policy in order to produce a first composite media stream, and alternatively (ii) to split a second composite media stream into a plurality of media streams; and a mini-device driver electrically coupled to said media scheduler and the media hardware device, said mini-device driver at least controls a transfer of said first composite media stream into the media hardware device.

31. Facilitating a real-time transfer of a plurality of media streams between a plurality of application programs operating in a non-real-time environment and a media hardware device, a method comprising the steps of:

producing a plurality of tasks to initiate and control said plurality of media streams generated by the plurality of application programs;

reconfiguring at least one attribute of at least one of said plurality of media streams prior to transmission to the media hardware device;

mixing media contained within said plurality of media streams according to a predetermined sharing policy in order to produce a composite media stream; and controlling propagation of said composite media stream into the media hardware device.

* * * * *

UNITED STATES PATENT AND TRADEMARK OFFICE
CERTIFICATE OF CORRECTION

PATENT NO. : 5,608,651
DATED : March 4, 1997
INVENTOR(S) : Andrew Kuzma

It is certified that error appears in the above-indentified patent and that said Letters Patent is hereby corrected as shown below:

In column 1 at line 32 delete "("Wave APE") and insert --("Wave API")--

In column 12 at line 26 delete "from" and insert --to form--

In column 13 at line 17 delete "claim 13," and insert --claim 15,--

Signed and Sealed this

Tenth Day of June, 1997

Attest:

BRUCE LEHMAN

Attesting Officer

Commissioner of Patents and Trademarks